Aug. 9, 1938.  G. K. O'CONNER  2,125,949
REGULATOR
Filed Nov. 8, 1934  3 Sheets-Sheet 1

Inventor
George K. O'Connor
by M. W. McCluskey
Attorney

Inventor
George K. O'Connor
by M. W. McCombs
Attorney

Aug. 9, 1938.   G. K. O'CONNER   2,125,949
REGULATOR
Filed Nov. 8, 1934   3 Sheets-Sheet 3

INVENTOR.
George K. O'Connor
BY
Jn. W. McConkey
ATTORNEY.

Patented Aug. 9, 1938

2,125,949

UNITED STATES PATENT OFFICE 2,125,949

REGULATOR

George K. O'Connor, Winnetka, Ill., assignor to Smoot Engineering Corporation, Chicago, Ill., a corporation of Delaware Application November 8, 1934, Serial No. 752,025

16 Claims. (Cl. 50—10)

This invention relates to regulators, and is illustrated as embodied in a regulator adapted for use in controlling the flow of a gas in a pipe, to maintain it at a constant pressure.

Regulators of this sort are used, with some well-known modifications in their adjustments, etc., for controlling fuel feeds, air supply, and the like, and they may (where desired) in turn be controlled manually or automatically, either directly or through a master controller for a bank of boilers or the like, according to some function (such as steam pressure) which it is desired to keep constant. It is desirable to avoid over-controlling, and "hunting", and therefore these regulators are preferably provided with stabilizing means having a gradual or dashpot action, so that the control is gradual and is accurately brought into balance without over-shooting.

The stabilizing means of such a regulator may be regarded as a device for artificially anticipating the effect of a changed regulator setting, and then gradually fading out as the actual effect builds up, thus compensating for the time lag as the changed setting takes effect.

An object of the present invention is to improve the stabilizing means of such regulators, both by lessening the cost of manufacture and by making their operation more certain and accurate. One feature of the invention relates to arranging the stabilizer so that it does not act directly on the weigh beam or its equivalent, but preferably acts to vary the tension of a spring or other means controlling the balance of the stabilizer, to give the desired gradual controlled operation indirectly by compensating changes in spring tension or the like.

One important feature relates to making the restoring force, and the gradual resistance, independent of the stabilizing force acting on the balance means, so that the restoring force and its resistance may be made heavy and positive, and yet the stabilizing force may be very sensitive and capable of very accurate action.

In the arrangement illustrated, the control diaphragm or its equivalent acts on balance means such as a weigh beam, shifting it to open in one direction or the other the pilot valve of a power cylinder, or an equivalent control device for other power operators, which finally operates by power the control valve or other device which is to be controlled. Instead of putting a stabilizer directly in this chain of connections, I arrange it to act thereon indirectly. For example, the balance on said weigh beam may normally be maintained in part by means, such as a spring, connected to the stabilizer. This permits the use of very sensitive means acting on the balance means, yet with very heavy and positive restoring forces.

The illustrated stabilizer includes a floating lever operatively connected at one end to the piston of the operating cylinder unit and at its other end to a dashpot or other control device, and which is intermediately connected by the above-described spring to the regulator weigh beam. The floating lever is also provided with novel return means tensioned by movement of the lever in either direction, and operative gradually, as fast as the dashpot permits, to return the lever to such a position that the above-mentioned spring is restored to its initial tension. If now the regulator has completed its work, the regulator weigh beam again balances in its initial position.

In addition to combining strong and positive restoring forces with a sensitive control of the weigh beam or its equivalent, this permits of adjustment of the return or restoring stroke only, by changing the tension of the restoring spring or of the dashpot action or both, without changing the speed and sensitivity of the compensating and anticipating action of the spring.

The return means for the stabilizer in itself embodies substantial novelty in this combination, and preferably includes a novel double-fulcrumed lever arranged to tension a return spring no matter which way it is rocked, the return spring then gradually overcoming the dashpot to return the regulator to a balanced condition.

The above and other objects and features of the invention, including various novel combinations of parts and desirable particular constructions, will be apparent from the following description of the illustrative embodiment shown in the accompanying drawings, in which:

Figures 1, 2, 3, and 4 are diagrammatic sectional views of one form of the regulator, with the parts in different positions;

Figure 1:
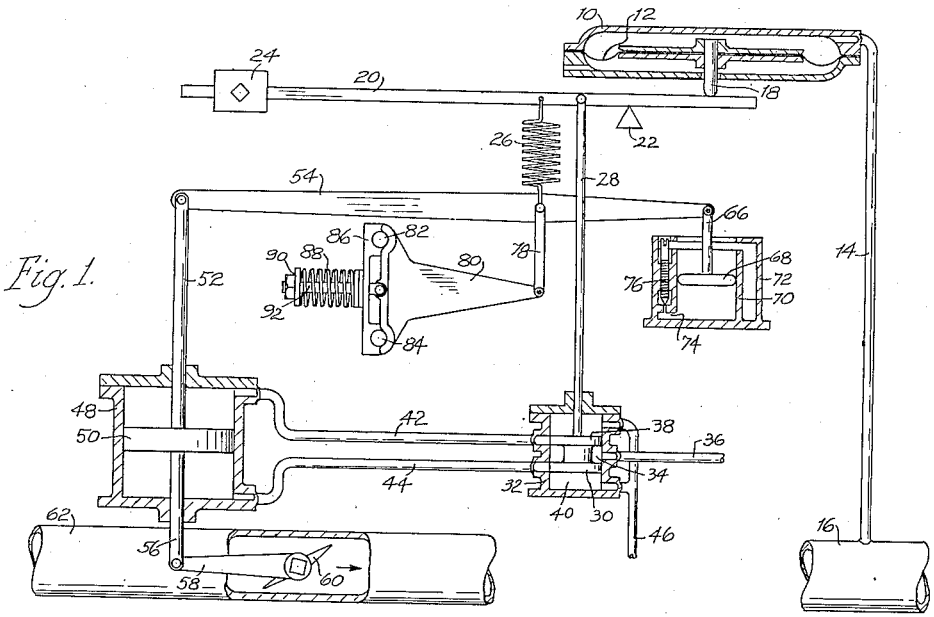

The regulator illustrated in Figure 1 includes a control device 10, shown with a diaphragm 12 subject to the pressures in a conduit 14. The conduit 14 may obtain its pressure from any desired source, as for example from a gas pipe or conduit 16.

The diaphragm 12 is provided with means such as a plunger 18 for operating a balance device, for example by operatively engaging one end of a weigh beam 20 pivoted between its ends on a fixed fulcrum 22. The beam 20 may be provided with an adjustable weight 24 which, with a spring 26 connected thereto and further described below, balances it against the pressure on the diaphragm 12. The weigh beam may also be acted on by suitable manual or automatic controllers, in a manner well known in this art.

The beam 20 is connected by means such as a connecting rod 28 with a pilot valve, illustrated as including a valve piston 30 connected to the rod 28 and slidable in a valve casing 32. The piston 30 has a central annular space 34 communicating with an intake conduit 36 leading from a source of oil or other fluid under pressure, and enlarged end portions 38 and 40 which, in the balanced condition of Figure 1, cover two ports leading to conduits 42 and 44. The upper and lower ends of the valve casing 32 communicate with a return line 46 leading back to the oil supply.

The lines 42 and 44 lead to the upper and lower ends of an operating cylinder 48 containing a piston 50 having a connecting rod 52 by which it is connected, in the arrangement shown, to a novel floating lever 54. The end of the lever 54 is shown connected, by means such as a link 56, to the device to be operated,—for example to an arm 58 operating a valve or damper 60 in a pipe or conduit 62. In an ordinary regulator, pipes 16 and 62 are different parts of the same pipe, the part 16 being beyond valve 60 in the direction of flow.

A regulator as thus far described is an operative unit, but due to the time lag in effecting a resultant change of pressure at 16 corresponding to a change of setting at 60, it has a tendency to over-control and hunt which according to my invention is overcome by the novel stabilizing means described below. This novel stabilizing means anticipates the result at 16 of a changed setting at 60, and compensates for it in restoring the weigh beam 20. This artificial compensation fades out as the actual changed pressure builds up at 16.

According to my invention, in the embodiment shown in Figure 1, the spring 26 is connected at its lower end to an intermediate portion of the floating lever 54, and the other end of the lever 54 is connected by means such as a connecting rod 66 to a piston 68 forming part of a dashpot. The illustrated dashpot includes a fixed casing formed as an inner cylinder 70 containing the piston 68, and an outer cylinder 72 defining an annular liquid reservoir surrounding the inner cylinder. The inner cylinder 70 communicates with this reservoir through a passage 74 controlled by an adjustable needle valve 76. Other forms of slow-acting resistance devices are intended to be included within the term "dashpot" as used herein.

At the point where the spring 26 is connected to the lever 54, there is connected a link or the like 78 pivoted to a double-fulcrum lever 80. The lever 80 fulcrums on a rounded pivot 82 when it is swung upwardly and on a similar pivot 84 when swung downwardly. The pivots 82 and 84 are best formed as integral bosses on a fixed bracket 86.

Whichever way it is swung, the lever 80 acts by power from piston 50 to tension a heavy return spring 88 confined and compressed between bracket 86 and an abutment 90 (shown as a washer backed up by an adjustable nut) on the end of a rod 92 passing axially through the return spring 88 and through an opening in the bracket 86, and pivoted or otherwise connected at its end to the lever 80 midway between its fulcrums 82 and 84. It should be especially noted that adjustments at 76 and 90 have no effect on spring 26, or on the change-anticipating phase of its action.

*Operation*

Figure 2:
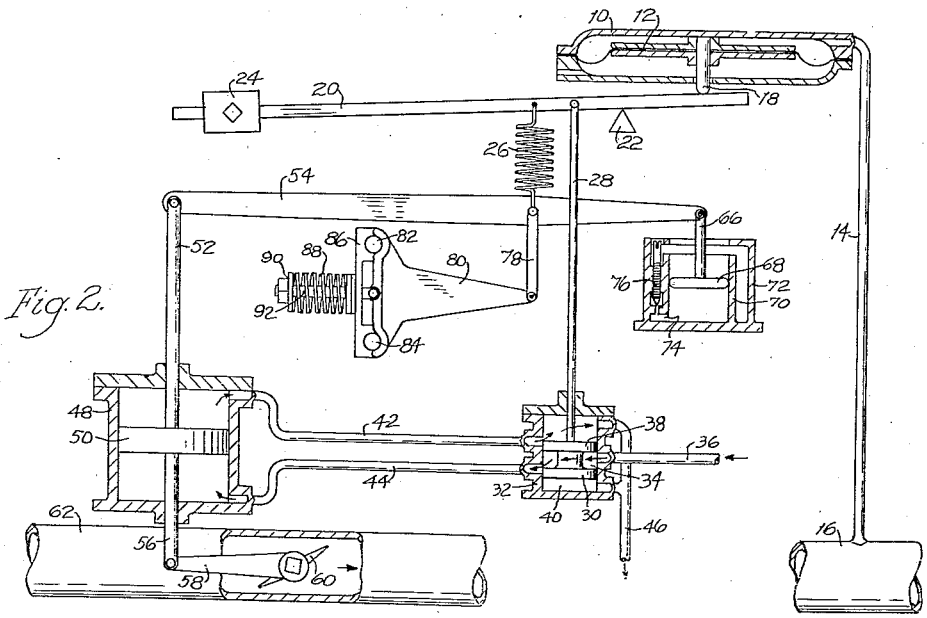

The regulator is shown in balanced condition in Figure 1. Figure 2 shows what happens if the pressure in conduit 14 drops. The weigh beam 20, being now unbalanced, swings in a counter-clockwise direction. This reduces the tension on the spring 26, and shifts the valve piston 30 downwardly. The power fluid then passes through the conduit 44 to the lower port of the cylinder 48, and pushes the piston 50 upwardly, swinging lever 54 upwardly about its connection to the dashpot, and also opening the valve or damper 60.

Figure 3:
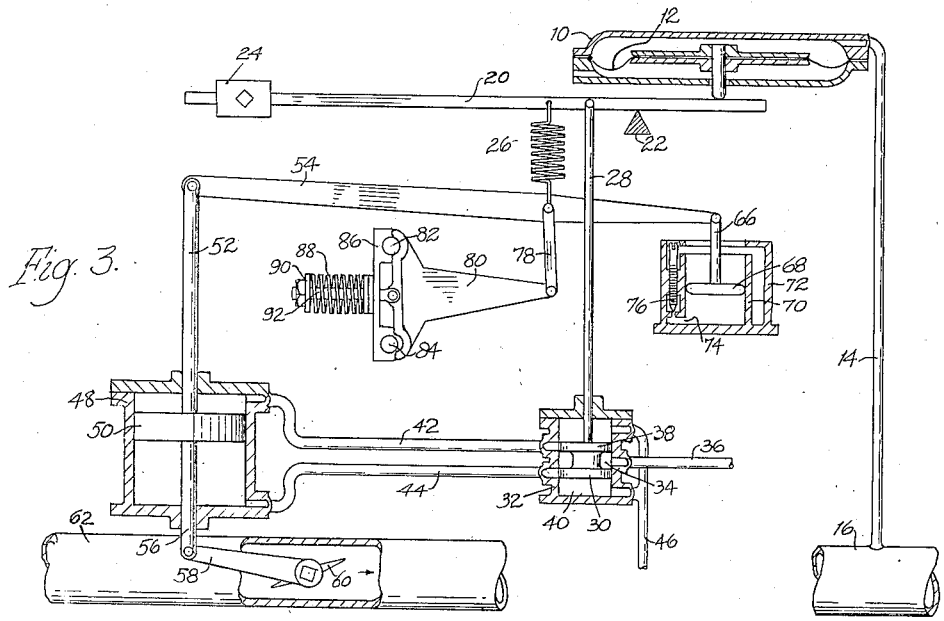

This shifts the ports into the positions shown in Figure 3. It will be noted that lever 54, in swinging upwardly, rocked lever 80 upwardly also, tensioning the return spring 88, and further reducing the tension of spring 26. This artificial reduction in the tension of spring 26 causes the weigh beam 20 to return to its balanced condition, and closes the valve 30 again, holding piston 50 and valve 60 in their new positions. In other words, the effect of the changed setting of valve 60 has been anticipated by an artificial and temporary compensatory change in the tension of the sensitive spring 26.

Figure 4:
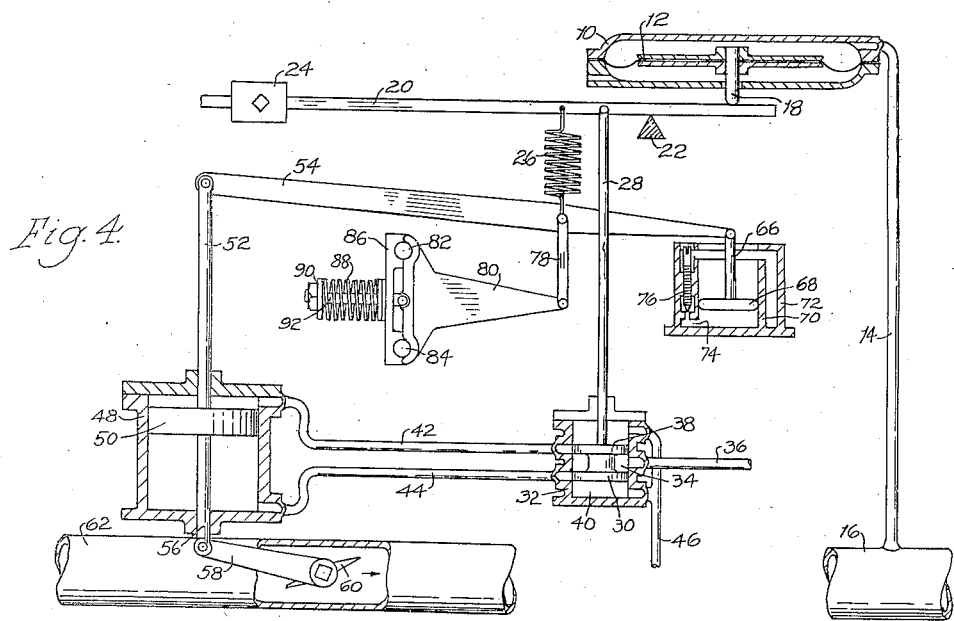

Spring 88 now yieldingly urges the lever 80 back to its initial position, thereby slowly pulling the lever 54 down to the position shown in Figure 4, as fast as the dashpot permits. During this movement, the lever 54 fulcrums about its connection to the connecting rod 52. This gradually increases the tension of spring 26 to keep it in balance with the pressure at this time building up in the space above the diaphragm 12.

The ports are now again in balance, as shown in Figure 4, the difference as compared to Figure 1 being that the valve or damper 60 has been slightly opened and the floating lever 54 is in a corresponding position. The point on the lever 54 connected to the spring 26 is in its initial position, restoring that spring to its initial balancing tension, the left hand end of lever 54 being higher and the righthand end lower than in Figure 1. As the lever 20 moved back to its balanced position, immediately upon the actuation of piston 50, it of course closed the valve 40 without waiting for pressure to build up in the conduit 16.

If the opening of the damper or valve 60, or whatever other control operation is performed, brings up the pressure in conduit 14 exactly to the original pressure, the parts will stay balanced in the positions shown in Figure 4. If not, the above cycle will be repeated, if necessary until the piston 50 reaches the extreme upper end of its stroke. If the pressure in conduit 14 rises too high, the reverse of the above cycle will be carried out.

Figure 5:
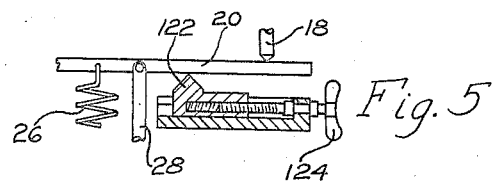
Figure 5 is a partial diagram corresponding to part of Figure 1, but showing an adjustment for the fulcrum of the weigh beam.

As shown in Figure 5, the effectiveness of the spring 26 may be varied, for example by adjusting the position of a fulcrum 122 for the beam 20. In this figure, the fulcrum 122 is in the form of a block having a threaded recess into which is adjustably threaded an operating device such as a screw 124. By turning the screw 124 the fulcrum may be shifted along the beam.

Figures 6, 7:
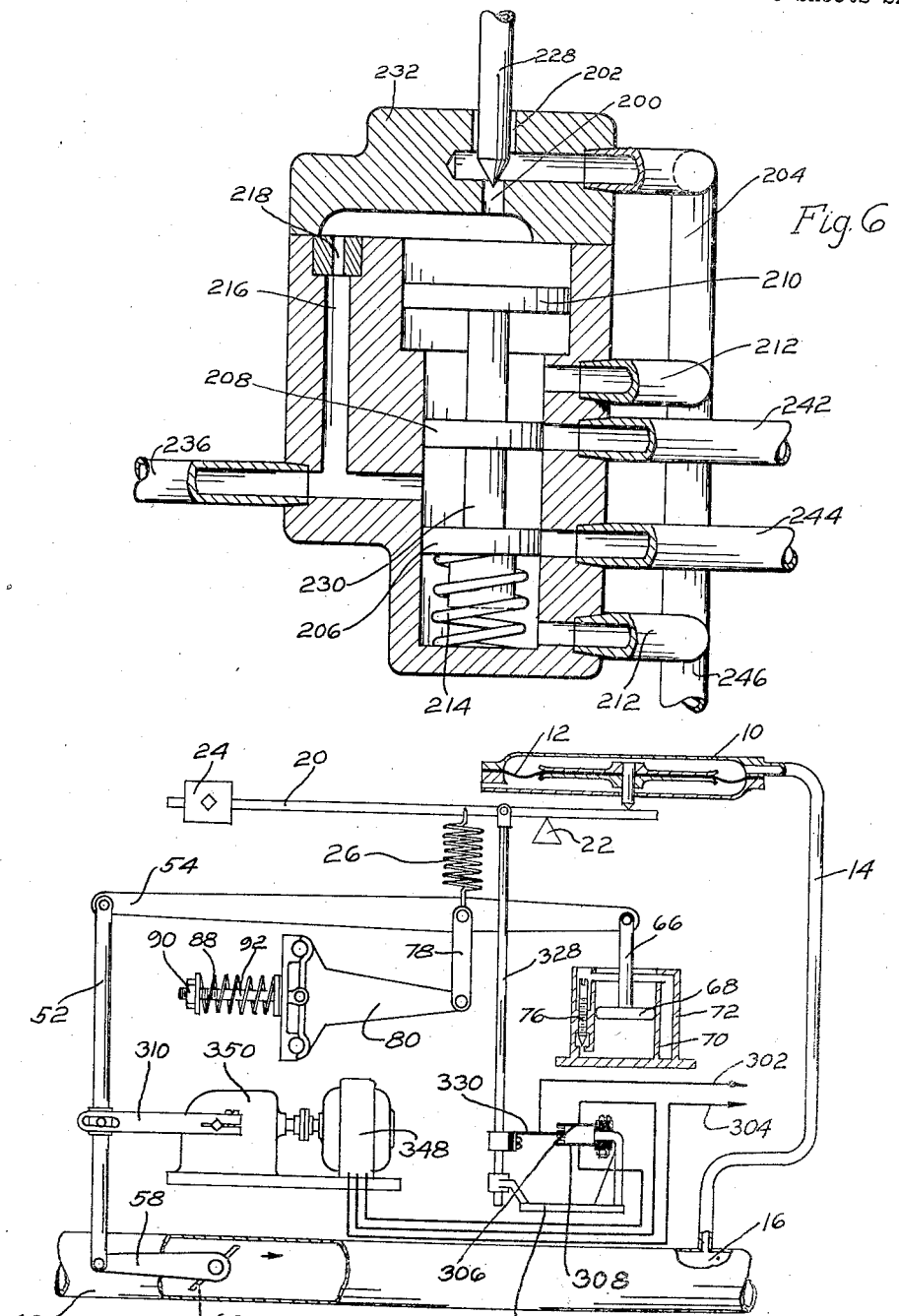
Figure 6 is a section showing an alternative valve.
Figure 7 is a diagram showing a regulator in which an electric motor forms the power means.

Figure 6 shows an alternative form of pilot valve. In this arrangement, the lower end of a control rod 228 (connected at its upper end the same as rod 28) is given a conical shape, so that its vertical movements will throttle more or less a port 200 in the valve casing 232. The space above the port 200 may communicate with the atmosphere directly through a clearance space 202, or its pressure may be atmospheric by reason of an overflow connection 204 leading to the exhaust conduit 246, or both.

The valve casing 232 is formed to receive a floating valve piston 230, having two equal-diameter heads 206 and 208 controlling the passages from the pressure-fluid source 236 and to the conduits 242 and 244, and having at its upper end a larger-diameter head 210. The spaces between heads 208 and 210, and below the head 206, are maintained at atmospheric pressure by connections 212 to the exhaust conduit 246. A spring 214 below the head 206 urges the valve piston upwardly.

The valve piston is moved vertically, to cover and uncover the ports leading to the conduits 242 and 244, by the balance of forces between spring 214 and the fluid pressure acting on the upper face of head 210. This fluid pressure is derived from the pressure-fluid conduit 236, through a branch conduit 216 having a controlling restriction 218, and giving a pressure against the upper face of head 210 which is controlled by the throttling action of the rod 228.

The arrangement of Figure 7 is the same as that of Figure 1, except that a control rod 328 (corresponding to valve rod 28), the lower end of which is shown slidably guided and supported in a bracket 300, carries an electric contact 330 insulated therefrom and connected in any desired manner to one side 302 of an electric circuit, the other side 304 of which is connected to one of the three terminals of a reversible electric motor 348.

The other two terminals of motor 348 are connected to contacts 306 and 308, respectively above and below the contact 330 and engaged thereby to run the motor 348 in one direction or the other as the control rod 328 is moved vertically by the balance beam 20.

The motor 348 is shown as driving a reduction gear 350, the driven shaft of which has mounted thereon an arm 310 having a pin-and-slot connection with the link 52 which connects the lever 54 and the arm 58.

While illustrative constructions have been described in detail, it is not my intention to limit the scope of the invention to that particular embodiment, or otherwise than by the terms of the appended claims.

I claim:

1. A regulator comprising a control device, a lever shifted by said control device, a fluid-power operating device having a valve shifted according to movements of the lever, a spring variably acting on said lever and which is changed as to its tension by operation of the fluid-power device, a fixed dashpot, and means connected to said dashpot and said fluid-power device for gradually restoring said spring to its initial tension after said fluid-power device is operated.

2. A regulator comprising a control device, balancing means shifted by said control device, a fluid-power operating device having a control valve selectively opened according to the direction of the shifting of said means, a spring variably acting on said balancing means and which is changed as to its tension by operation of the fluid-power device, a fixed dashpot, and means connected to said dashpot and said fluid-power device for gradually restoring said spring to its initial tension after said fluid-power device is operated.

3. A regulator comprising a balance means acted on according to a condition to be controlled, means for changing said condition to control the condition, and a device controlled by the balance means and controlling said condition-changing means in combination with a spring acting on said balance means, and a floating lever acted on at one end by said condition-changing means and having a dashpot controlling the movement of its other end and having an intermediate connection to said spring.

4. A regulator comprising a balance means acted on according to a condition to be controlled, means for changing said condition to control the condition, and a device controlled by the balance means and controlling said condition-changing means in combination with yielding means acting in tension on said balance means, and a floating lever acted on at one end by said condition-changing means and having a dashpot controlling the movement of its other end and having an intermediate connection to said yielding means.

5. A regulator comprising a balance means acted on according to a condition to be controlled, means for changing said condition to control the condition, and a device controlled by the balance means and controlling said condition-changing means in combination with a spring acting on said balance means, a floating lever acted on at one end by said condition-changing means and having a dashpot controlling the movement of its other end and having an intermediate connection to said spring, and a return device tensioned by movement of said lever by the condition-changing means and acting gradually to overcome the resistance of the dashpot and to return said intermediate connection to its initial position.

6. A regulator comprising a balance means acted on according to a condition to be controlled, means for changing said condition to control the condition, and a device controlled by the balance means and controlling said condition-changing means in combination with yielding means acting in tension on said balance means, a floating lever acted on at one end by said condition-changing means and having a dashpot controlling the movement of its other end and having an intermediate connection to said yielding means, and a return device tensioned by movement of said lever by the condition-changing means and acting gradually to overcome the resistance of the dashpot and to return said intermediate connection to its initial position.

7. A stabilizer for a regulator having balance means to effect control of a condition and a sensitive element responsive to said condition and acting on said balance means comprising a spring affecting the regulator balance and means for first quickly changing the tension of said spring as the regulator setting is changed and then gradually restoring it to its initial tension, said means including a return spring acting against a fixed member and tensioned by changes in the regulator setting.

8. A stabilizer for a regulator having balance means to effect control of a condition and a sensitive element responsive to said condition and acting on said balance means comprising a spring affecting the regulator balance and means for first quickly changing the tension of said spring as the regulator setting is changed and then gradually restoring it to its initial tension, the change in tension of said spring being in a sense opposing the change in the regulator setting, whereby the gradual restoration of the spring tension compensates for the gradual change in the condition being controlled caused by the change in the regulator setting until said condition reaches a value corresponding to the changed setting, said means including a return spring acting against a fixed member and tensioned by changes in the regulator setting.

9. A stabilizer for a regulator having balance means to effect control of a condition and a sensitive element responsive to said condition and acting on said balance means comprising a spring affecting the regulator balance and means for first quickly changing the tension of said spring as the regulator setting is changed and then gradually restoring it to its initial tension, said means including a return spring tensioned by changes in the regulator setting and a double-fulcrum lever tensioning the return spring acting against a fixed member and in whichever sense the regulator setting is changed.

10. A stabilizer for a regulator having balance means to effect control of a condition and a sensitive element responsive to said condition and acting on said balance means comprising a spring affecting the regulator balance and means for first quickly changing the tension of said spring as the regulator setting is changed and then gradually restoring it to its initial tension, the change in tension of said spring being in a sense opposing the change in the regulator setting, whereby the gradual restoration of the spring tension compensates for the gradual change in the condition being controlled caused by the change in the regulator setting until said condition reaches a value corresponding to the changed setting, said means including a return spring acting against a fixed member and tensioned by changes in the regulator setting and a double-fulcrum lever tensioning the return spring in whichever sense the regulator setting is changed.

11. A return device for a regulator stabilizer or the like comprising a fixed support having two spaced fulcrums, a lever adapted to rock about either of said fulcrums, a coil spring having one end engaging said support between said fulcrums, a connection from said lever passing through the support between said fulcrums and through said spring and having thrust means engaging the other end of said spring and a connection from said lever to the regulator whereby said device will always tend to return the regulator to its neutral position.

12. A regulator comprising a balance means acted on according to a condition to be controlled, means for changing said condition to control it, a device controlled by the balance means and controlling said condition-changing means, a floating lever connected at spaced points to said device and said balance means, a spring forming the connection between the lever and balance means and variably tensioned by movement of the lever to affect the balance means, a dashpot connected to said lever at a third point spaced from both of said first named points, and a return device connected to the lever at the same point as said balance means for constantly urging said point to return to the same neutral position said return device including a spring acting against a fixed member and tensioned by movement of the connection in either direction from neutral.

13. A regulator comprising a balance means acted on according to a condition to be controlled, means for changing said condition to control it, a device controlled by the balance means and controlling said condition-changing means, a yielding connection from said device to said balance means to produce an anticipating effect on the balance means before said condition has time to adjust itself to the condition-changing means, and a return device acting on said connection for constantly urging it to return to the same neutral position said return device including a spring acting against a fixed member and tensioned by movement of the connection in either direction from neutral.

14. A regulator comprising a balance means acted on according to a condition to be controlled, means for changing said condition to control it, a device controlled by the balance means and controlling said condition-changing means, a spring connected to said balance means, means connecting said spring to the device, and a return device acting on said spring for constantly urging it to return to the same position whereby the spring will exert a constant force on the balance means said return device including a spring acting against a fixed member and tensioned by movement of the connection in either direction from neutral.

15. A regulator having balance means affected by a condition to be controlled, sensitive means connected to said balance means, a reversible electric motor controlled by said balance means to change the regulator setting to cause a change in said condition to compensate for changes exerted thereby on said balance means, a stabilizing device operated by the motor for actuating said sensitive means to have an anticipating effect on the balance means before said condition has time to adjust itself to a new regulator setting, and a gradually-acting restoring device connected to said stabilizing device to restore said sensitive means to its initial setting as said condition changes to correspond to a new regulator setting.

16. A regulator having balance means affected by a condition to be controlled, sensitive means connected to said balance means, a reversible electric motor controlled by said balance means to change the regulator setting to cause a change in said condition to compensate for changes exerted thereby on said balance means, a stabilizing device operated by the motor for actuating said sensitive means to have an anticipating effect on the balance means before said condition has time to adjust itself to a new regulator setting, and a gradually-acting restoring device connected to said stabilizing device to restore said sensitive means to its initial setting as said condition changes to correspond to a new regulator setting, and means to adjust the restoring action of said restoring device without changing the anticipating action of the sensitive means.

GEORGE K. O'CONNOR.

CERTIFICATE OF CORRECTION.

Patent No. 2,125,949.   August 9, 1938.

GEORGE K. O'CONNOR.

It is hereby certified that error appears in the printed specification of the above numbered patent requiring correction as follows: Page 4, first column, lines 31 and 32, claim 9, strike out the words "acting against a fixed member and" and insert the same after "spring", line 29, same claim; and that the said Letters Patent should be read with this correction therein that the same may conform to the record of the case in the Patent Office.

Signed and sealed this 4th day of October, A. D. 1938.

Henry Van Arsdale (Seal)   Acting Commissioner of Patents.